United States Patent [19]
Finn et al.

[11] Patent Number: 5,931,641
[45] Date of Patent: *Aug. 3, 1999

[54] STEAM TURBINE BLADE HAVING AREAS OF DIFFERENT DENSITIES

[75] Inventors: Scott Roger Finn, Niskayuna; Ravindra Kumar Pandey; John James Fitzgerald, both of Clifton Park, all of N.Y.; William Elliott Bachrach, Bennington, Vt.; Donald Frederick Mowbray, Burnt Hills, N.Y.

[73] Assignee: General Electric Company, Schenectady, N.Y.

[ * ] Notice: This patent is subject to a terminal disclaimer.

[21] Appl. No.: 08/932,870

[22] Filed: Sep. 18, 1997

Related U.S. Application Data

[63] Continuation-in-part of application No. 08/837,880, Apr. 25, 1997, Pat. No. 5,839,882.

[51] Int. Cl.⁶ .................................................... F01D 5/28
[52] U.S. Cl. ......................................... 416/229 A; 416/230
[58] Field of Search ............................ 415/200; 416/224, 416/229 R, 229 A, 230, 232, 241 A

[56] References Cited

U.S. PATENT DOCUMENTS

| | | |
|---|---|---|
| 3,637,325 | 1/1972 | Morley . |
| 3,779,338 | 12/1973 | Hayden et al. . |
| 3,796,513 | 3/1974 | Jonas ..................................... 416/229 A |
| 4,118,147 | 10/1978 | Ellis . |
| 4,594,761 | 6/1986 | Murphy et al. . |
| 4,643,647 | 2/1987 | Perry . |
| 5,197,852 | 3/1993 | Walker et al. . |
| 5,295,789 | 3/1994 | Daguet . |
| 5,429,877 | 7/1995 | Eylon . |
| 5,634,771 | 6/1997 | Howard et al. ..................... 416/241 A |
| 5,655,883 | 8/1997 | Schilling ............................. 416/229 A |
| 5,839,882 | 11/1998 | Finn et al. .......................... 416/229 A |

FOREIGN PATENT DOCUMENTS

| | | |
|---|---|---|
| 0764763 | 3/1997 | European Pat. Off. . |
| 0764764 | 3/1997 | European Pat. Off. . |
| 0786580 | 7/1997 | European Pat. Off. . |
| 1040825 | 9/1966 | United Kingdom . |
| 2168111 | 6/1986 | United Kingdom . |
| 22264755 | 9/1993 | United Kingdom . |

*Primary Examiner*—Christopher Verdier
*Attorney, Agent, or Firm*—Douglas E. Erickson; Marvin Snyder

[57] ABSTRACT

A lightweight steam turbine blade includes a metallic airfoil portion with at least one surface recess containing a void volume having adjacent first and second regions. Filler material is placed in and bonded to the surface recess and generally completely fills the void volume. The filler material in the first region has a higher average modulus of elasticity than that of the filler material in the second region.

14 Claims, 3 Drawing Sheets

STEAM TURBINE BLADE HAVING AREAS OF DIFFERENT DENSITIES

CROSS-REFERENCE TO RELATED APPLICATIONS

The present patent application is a continuation-in-part application of U.S. patent application Ser. No. 08/837,880 filed Apr. 25, 1997. U.S. Pat. No. 5,839,882 by Scott R. Finn et al. which is entitled "Gas Turbine Blade Having Areas of Different Densities" and which issue Nov. 24,1998.

FIELD OF THE INVENTION

The present invention relates generally to gas and steam turbines, and more particularly to a steam turbine blade having two or more areas of different mass densities.

BACKGROUND OF THE INVENTION

Gas turbines include, but are not limited to, gas turbine power generation equipment and gas turbine aircraft engines. A gas turbine includes a core engine having a high pressure compressor to compress the air flow entering the core engine, a combustor in which a mixture of fuel and the compressed air is burned to generate a propulsive gas flow, and a high pressure turbine which is rotated by the propulsive gas flow and which is connected by a larger diameter shaft to drive the high pressure compressor. A typical front fan gas turbine aircraft engine adds a low pressure turbine (located aft of the high pressure turbine) which is connected by a smaller diameter coaxial shaft to drive the front fan (located forward of the high pressure compressor) and to drive an optional low pressure compressor (located between the front fan and the high pressure compressor). The low pressure compressor sometimes is called a booster compressor or simply a booster.

The fan and the high and low pressure compressors and turbines have gas turbine blades each including an airfoil portion attached to a shank portion. Rotor blades are those gas turbine blades which are attached to a rotating gas turbine rotor disc. Stator vanes are those gas turbine blades which are attached to a non-rotating gas turbine stator casing. Typically, there are alternating circumferential rows of radially-outwardly extending rotor blades and radially-inwardly extending stator vanes. When present, a first and/or last row of stator vanes (also called inlet and outlet guide vanes) may have their radially-inward ends also attached to a non-rotating gas turbine stator casing. Counterrotating "stator" vanes are also known. Conventional gas turbine blade designs typically have airfoil portions that are made entirely of metal, such as titanium, or are made entirely of a composite. The all-metal blades, including costly wide-chord hollow blades, are heavier in weight which results in lower fuel performance and require sturdier blade attachments, while the lighter all-composite blades are more susceptible to damage from bird ingestion events. Known hybrid blades include a composite blade having an airfoil shape which is covered by a surface cladding (with only the blade tip and the leading and trailing edge portions of the surface cladding comprising a metal) for erosion and bird impact reasons. The fan blades typically are the largest (and therefore the heaviest) blades in a gas turbine aircraft engine, and the front fan blades are the first to be impacted by a bird strike.

Steam turbines include, but are not limited to, steam turbine power generation equipment. A steam turbine includes a steam inlet, a turbine, and a steam outlet, wherein steam turns the turbine rotor. The turbine of a steam turbine is similar to the turbine of a gas turbine. Steam turbine blades, which are generally identical to gas turbine blades, each include an airfoil portion attached to a shank portion. Rotor blades are those steam turbine blades which are attached to a rotating steam turbine rotor disc. Stator vanes are those steam turbine blades which are attached to a non-rotating steam turbine stator casing. Typically, there are alternating circumferential rows of radially-outwardly extending rotor blades and radially-extending stator vanes, wherein the stator vanes radially extend between, and are attached to, radially outer and inner rings. Conventional steam turbine blade designs typically have airfoil portions that are made entirely of metal. The all-metal blades are costly and heavy in weight which results in higher steam turbine prices and which requires sturdy blade attachments.

What is needed is a lighter-weight steam turbine blade.

SUMMARY OF THE INVENTION

The steam turbine blade of the invention includes a shank portion and a metallic airfoil portion attached to the shank portion. The airfoil portion has a pressure side and a suction side, wherein at least one of the pressure and suction sides includes at least one surface recess having a void volume, an open top, and a closed bottom, and wherein the void volume has adjacent first and second regions. The steam turbine blade of the invention also includes filler material located in and bonded to the at-least-one surface recess and generally completely filling the void volume. The filler material as a whole has a lower average mass density than that of the metallic airfoil portion as a whole. The filler material in the first region has a higher average modulus of elasticity than that of the filler material in the second region.

Several benefits and advantages are derived from the steam turbine blade of the invention. The metallic airfoil portion provides structural strength while the filler material maintains the blade's aerodynamic geometry with a lower weight material. The lower weight allows for a less-robust blade attachment. In addition, having a first region of a higher-modulus-of-elasticity filler material and a second region of a lower-modulus-of-elasticity filler material allows designs which locate the first region near the bottom of the surface recess for better attachment and lower shearing distortion or which locate the first region near the top of the surface recess to improve airfoil distortion.

DETAILED DESCRIPTION OF THE INVENTION

Figure 1:
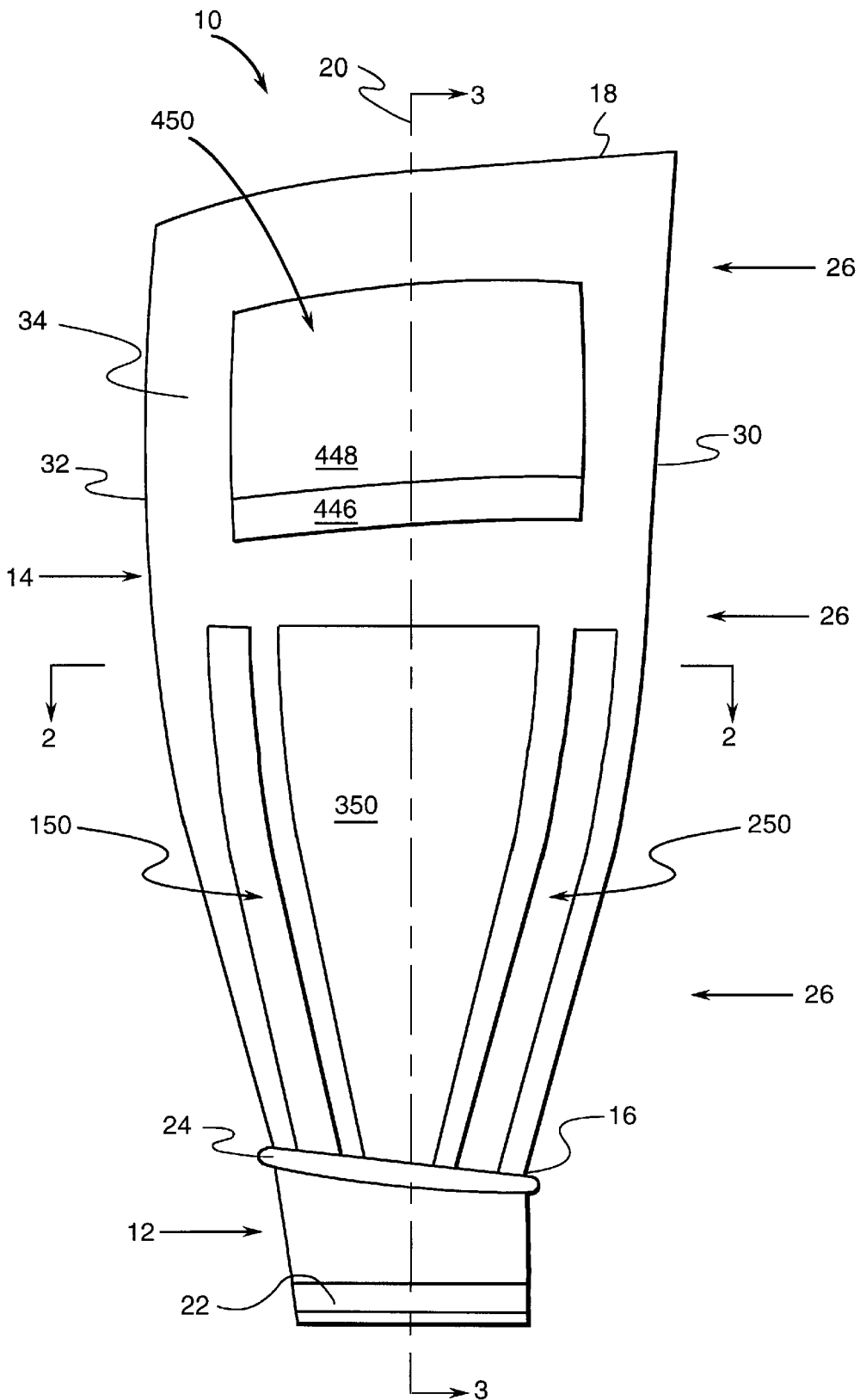
FIG. 1 is a schematic side-elevational view of the pressure side of a preferred embodiment of the steam turbine blade of the present invention.
Figure 2:
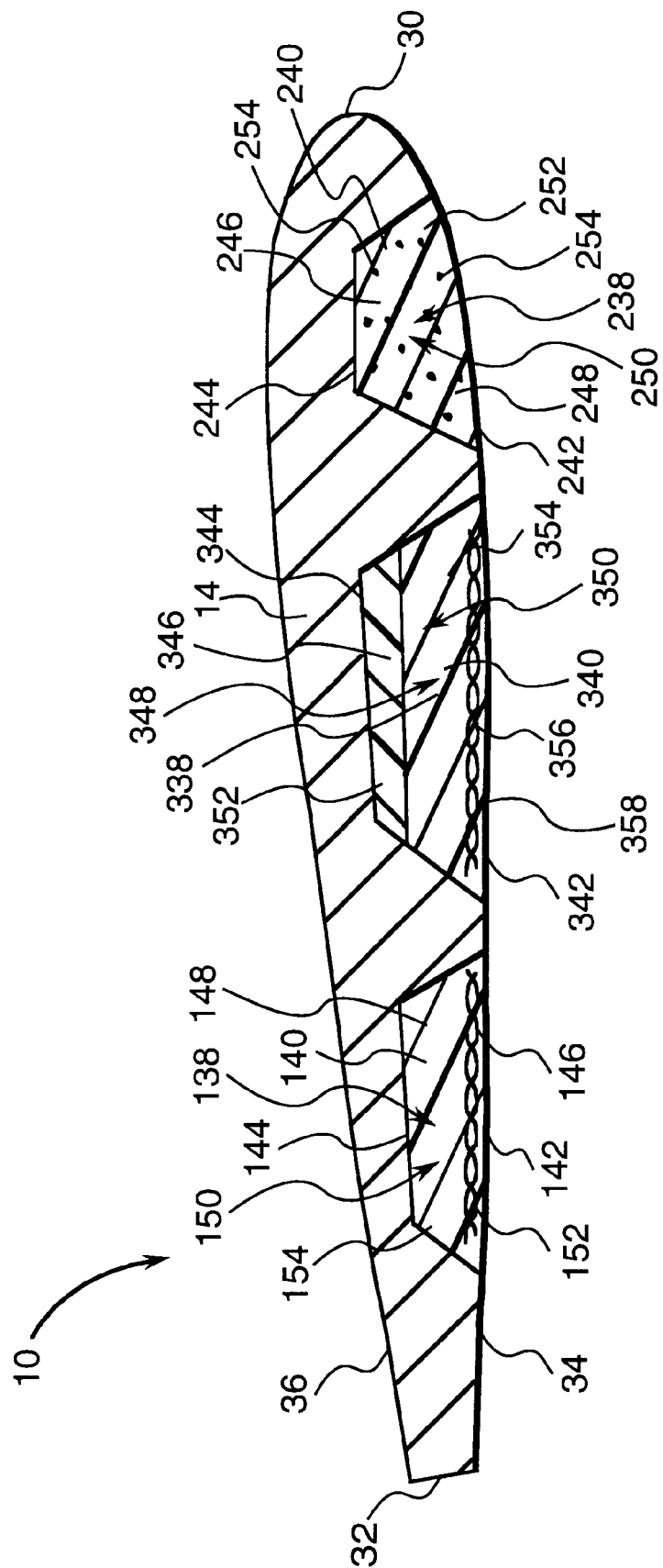
FIG. 2 is a schematic cross-sectional view of the airfoil portion of the steam turbine blade of FIG. 1, taken along lines 2—2 of FIG 1.
Figure 3:
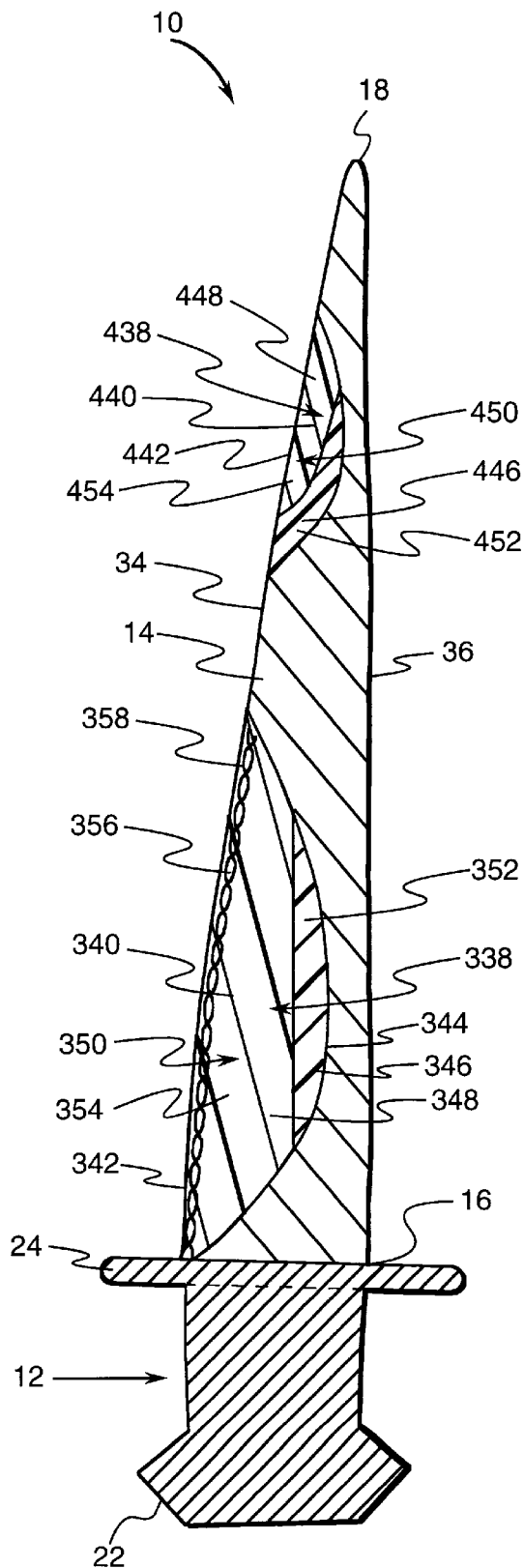
FIG. 3 is a schematic cross-sectional view of the steam turbine blade of FIG. 1, taken along lines 3—3 of FIG. 1.

Referring now to the drawings, wherein like numerals represent like elements throughout, FIGS. 1 through 3 schematically show a preferred embodiment of the steam turbine blade 10 of the present invention. The steam turbine blade 10 includes a shank portion 12 and a metallic airfoil portion 14 attached to the shank portion 12. Preferably, the metallic airfoil portion 14 consists essentially of titanium.

Other choices for the metallic airfoil portion 14 include, but are not limited to, aluminum, cobalt, nickel, or steel. The metallic airfoil portion 14 has an operating temperature range, a design rotational speed, a blade root 16 (which is the part of the metallic airfoil portion 14 which is attached to the shank portion 12), a blade tip 18, and a radial axis 20 extending outward toward the blade tip 18 and inward toward the blade root 16. The shank portion 12 typically includes a dovetail 22, for attachment of the blade 10 to a rotor disc (not shown), and a blade platform 24, for helping to radially contain the steam flow (the steam flow direction being indicated by arrows 26 in FIG. 1). A preferred dovetail (not shown) has radially-extending fingers which engage slots in the rotor disc. The metallic airfoil portion 14 has a leading edge 30 and a trailing edge 32, wherein the steam flow direction 26 is generally from the leading edge 30 to the trailing edge 32. The metallic airfoil portion 14 also has a pressure (concave-shaped) side 34 and a suction (convexshaped) side 36, wherein the steam turbine blade 10 rotates in a direction such that the pressure side 34 passes a reference point before the suction side 36 passes the same reference point.

At least one of the pressure and suction sides 34 and 36, and preferably only the pressure side 34 as shown in the figures, includes at least one surface recess, such as first, second, third, and fourth surface recesses 138, 238, 338, and 438 as shown in the figures. The at-least-one surface recess, as illustrated by the first surface recess 138, has a void volume 140, an open top 142, and a closed bottom 144 wherein the void volume 140 has adjacent first and second regions 146 and 148. Preferably, the metallic airfoil portion 14 is forged, extruded, or cast, and that the surface recesses 138, 238, 338, and 438 preferably are further machined by chemical milling, electro-chemical machining, water-jet milling, electro-discharge machining, or high speed machining.

The steam turbine blade 10 additionally includes filler material, such as filler material 150, which is disposed in and bonded to the at-least-one surface recess, as illustrated by the first surface recess 138 and which generally completely fills the void volume, as illustrated by void volume 140. It is noted that the metallic airfoil portion 14 and/or the filler material, such as filler material 150, may contain holes, cavities, and the like. The filler material, such as filler material 150, as a whole has a lower average mass density than that of the metallic airfoil portion 14 as a whole. The filler material, such as filler material 150, in the first region, such as first region 146, has a higher (and preferably at least a generally twenty percent higher) average modulus of elasticity than that of the filler material, such as filler material 150, in the second region, such as second region 148. The choice for bonding the filler material 150 to the surface recess 138 includes, without limitation, self adhesion, adhesion between the filler material 150 and the surface recess 138, adhesive bonding (adhesive film or paste), and fusion bonding.

A first preferred construction is illustrated by the first surface recess 138. Here, the void volume 140 consists essentially of the first and second regions 146 and 148. The first region 146 is a layer disposed proximate the open top 142, and the second region 148 is a layer disposed proximate the closed bottom 144 of the first surface recess 138. The filler material 150 consists essentially of different first and second materials 152 and 154 which preferably are bonded to each other (such as according to the previously-discussed bonding choices) as well as to the surface recess 138. The second material 154 is generally the only filler material 150 disposed in the second region 148, and the first and second materials 152 and 154 are generally the only filler material 150 disposed in the first region 146. The first material 152 consists essentially of a screen material as best seen in FIG. 2. The openings in the screen material would be filled with the second material 154 when the screen material is disposed in the first region 146. In an exemplary enablement, the second material 154 consists essentially of an elastomer, such as poly(dimethylsiloxane), and the screen material consists essentially of metal. Other choices for the elastomer include, without limitation, poly(diphenyldimethylsiloxane), poly(flurosiloxanes), Viton™, polysulfide, poly(thiolether), and poly(phosphzenes). Other choices for the screen material include, without limitation, a woven or braided fiber comprising, for example, aramid, glass, or carbon fiber. Preferably, the average modulus of elasticity of the screen material is at least generally one-hundred times higher than that of the elastomer. The screen material especially helps a very soft elastomer (i.e., an elastomer having a very low modulus of elasticity) to maintain its shape under the centrifugal loading of a rotating blade so that the design airfoil shape may be maintained even when the elastomer alone would be subject to surface distortion due to blade rotation. The screen material also helps protect against surface wear (i.e., erosion) due to hail, ice, pebbles, tar, and the like. Preferably, the screen material is bonded to the elastomer and the elastomer is bonded to the surface recess 138 (such as according to the previously-discussed bonding choices).

A second preferred construction is illustrated by the second surface recess 238. Here, the void volume 240 consists essentially of the first and second regions 246 and 248. The first region 246 is that part of the void volume 240 which is disposed nearer the closed bottom 244, and the second region 248 is that part of the void volume 240 which is disposed nearer the open top 242 of the second surface recess 238. The filler material 250 consists essentially of a non-metallic matrix material 252 and particulate material 254. The particulate material 254 is embedded in the non-metallic matrix material 252. The non-metallic matrix material 252 is disposed throughout the first and second regions 246 and 248. The first region 246 has a higher volume concentration of the particulate material 254 than that of the second region 248. In an exemplary enablement, the non-metallic matrix material 252 consists essentially of an elastomer, and the particulate material 254 consists essentially of metallic powder. Other choices for the non-metallic matrix material 252 include, without limitation, epoxy resin. Other choices for the particulate material 254 (which serves to increase stiffness) include, without limitation, hollow glass spheres, chopped glass fibers, or fumed silica.

The higher volume concentration of the particulate material 254 nearer the closed bottom 244 makes the filler material 250 stiffer near the closed bottom 244 and softer near the open top 242. Having a stiffer filler material 250 near the closed bottom 244 provides for better attachment of that portion of the filler material 250 to the second surface recess 238 when the steam turbine blade 10 is subject to the centrifugal force of a rotating blade 10 or the disbonding effects of a harsh operating environment. Also, having stiffer filler material 250 near the closed bottom 244 reduces shear distortion of the filler material 250 because shears are highest there. This also helps maintain aerodynamic shape.

A third preferred construction is illustrated by the third surface recess 338. Here, the first region 346 is a layer disposed proximate the closed bottom 344, and the second region 348 is layer disposed adjacent the first region 346.

The filler material 350 includes different first and second materials 352 and 354. The first material 352 is generally the only filler material 350 disposed in the first region 346, and the second material 354 is generally the only filler material 350 disposed in the second region 348. Preferably, the second material 354 consists essentially of an elastomer, and the first material 352 consists essentially of a non-metallic material other than an elastomer. Choices for such non-metallic material include, without limitation, structural foam and composites having non-metal fibers. In an exemplary construction, the void volume 340 also has a third region 356. The third region 356 is a layer disposed adjacent the second region 348 and proximate the open top 342 of the third surface recess 338. The filler material 350 also includes a third material 358. The second and third materials 354 and 358 are generally the only filler materials 350 disposed in the third region 356. The third material 358 consists essentially of a screen material which has a higher modulus of elasticity than that of the first material 352 or the second material 354.

Having a layer of stiffer (higher modulus of elasticity) first material 352 proximate the closed bottom 344 of the third surface recess 338 provides for better attachment of that portion of the filler material 350 to the third surface recess 338 when the steam turbine blade 10 is subject to the centrifugal force of a rotating blade 10 or the disbanding effects of a harsh operating environment fuel. Also, having stiffer filler material 350 near the closed bottom 344 reduces shear distortion of the filler material 350 because shears are highest there. This also helps maintain aerodynamic shape. Having a screen material as a third material 358 proximate the open top 142 of the third surface recess 338 helps protect against surface wear (i.e., erosion) due to hail, ice, pebbles, tar, and the like. The screen material also helps a very soft second material 354 to retain its shape while the blade 10 is rotating.

A fourth preferred construction is illustrated by the fourth surface recess 438. Here, the void volume 440 consists essentially of the first and second regions 446 and 448. The first region 446 extends closer to the shank portion 12 than the second region 448, and preferably the second region 448 extends further from the shank portion 12 than the first region 446. In an exemplary construction, the first region 446 includes a portion disposed proximate the open top 442 and the second region also includes a portion disposed proximate the open top 442 of the fourth surface recess 438. The filler material 450 consists essentially of different first and second materials 452 and 454. The first material 452 is generally the only filler material 450 disposed in the first region 446, and the second material 454 is generally the only filler material 450 disposed in the second region 448. Preferably, the second material 454 consists essentially of an elastomer, and the first material 452 consists essentially of a nonmetallic material other than an elastomer.

The particular locations of the first and second regions 446 and 448 in the fourth surface recess 438 places the stiffer (higher modulus of elasticity) first material 452 in the first region 446 which is closer to the shank portion 12 and which is that region of the fourth surface recess 438 where the filler material 450 is most prone to airfoil shape distortion under blade rotation. Additionally, the stiffer (higher modulus of elasticity) first material 452 provides for better attachment of the filler material 450 in the first region 446 to the fourth surface recess 438 when the steam turbine blade 10 is subject to the centrifugal force of a rotating blade 10 or the disbonding effects of a harsh operating environment.

It is noted that the shank portion 12 preferably is a metal shank portion. However, a composite shank portion (suitably bonded or otherwise affixed to the metallic airfoil portion 14) may be employed in particular blade designs. It is noted that the dovetail 22 of the shank portion 12 can be partially composite (not shown) on the pressure (concave) side. Alternatively, the dovetail 22 can have a metal wedge system (also not shown) to positively capture adjoining composite sections and provide a metallic dovetail wear surface. Holes or cavities (not shown) of appropriate number, size, location, and orientation may be formed in the shank portion 12 to reduce the weight of the steam turbine blade 10. Such holes may even extend into, or be present in, the metallic airfoil portion 14 and the filler material 150, 250, 350, and 450.

It is further noted that when an elastomer is used as filler material 150, 250, 350, and 450, such elastomer preferably has an average modulus of elasticity of between generally 250 pounds-per-square-inch (psi) and generally 50,000 pounds-per-square-inch (psi) (and more preferably between generally 250 psi and generally 20,000 psi) over the operating temperature range. An elastomer that is too soft (i.e., having an average modulus of elasticity less than generally 250 psi) may not be able to structurally provide an airfoil shape, and an elastomer that is too hard (i.e., having an average modulus of elasticity greater than generally 50,000 psi) may not be able to be manufactured to required close tolerances. A more preferred range for the average modulus of elasticity is between generally 500 psi and generally 15,000 psi. In some applications a conventional skin (not shown) and a conventional erosion coating (not shown) may cover the exposed surfaces of the steam turbine blade 10.

It is pointed out that in an exemplary enablement, the third surface recess 338 would have its filler material 350 replaced with the filler material 450 of the fourth surface recess 438, and an elastomer having a uniform modulus of elasticity would completely fill the void volumes 140, 240, and 440 in the first, second, and fourth surface recesses 138, 238, and 438.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

We claim:

1. A steam turbine blade comprising:
   a) a steam-turbine-blade shank portion;
   b) a steam-turbine-blade metallic airfoil portion attached to said shank portion and having a pressure side and a suction side, wherein at least one of said pressure and suction sides includes at least one surface recess, wherein said at-least-one surface recess has a void volume, an open top, and a closed bottom, and wherein said void volume has adjacent first and second regions; and
   c) filler material disposed in and bonded to said at-least-one surface recess and generally completely filling said void volume, wherein said filler material as a whole has a lower average mass density than that of said metallic airfoil portion as a whole, wherein said filler material in said first region has a higher average modulus of elasticity than that of said filler material in said second region, and wherein said first and second regions together fill at least half of said void volume.

2. The steam turbine blade of claim 1, wherein said filler material in said first region has at least a generally twenty percent higher average modulus of elasticity than that of said filler material in said second region.

3. The seam turbine blade of claim 1, wherein said void volume consists essentially of said first and second regions, wherein said first region is a layer disposed proximate said open top and said second region is a layer disposed proximate said closed bottom, wherein said filler material consists essentially of different first and second materials, wherein said filler material disposed in said second region consists essentially of said second material, wherein said material disposed in said first region consists essentially of said first and second materials, and wherein said first material consists essentially of a screen material.

4. The steam turbine blade of claim 3, wherein said second material consists essentially of an elastomer, and wherein the average modulus of elasticity of said screen material is at least generally one-hundred times higher than that of said elastomer.

5. The steam turbine blade of claim 1, wherein said void volume consists essentially of said first and second regions, wherein said first region is that part of said void volume which is disposed nearer said closed bottom and said second region is that part of said void volume which is disposed nearer said open top, wherein said filler material consists essentially of a non-metallic matrix material and particulate material, wherein said particulate material is embedded in said non-metallic matrix material, wherein said non-metallic matrix material is disposed throughout said first and second regions, and wherein said first region has a higher volume concentration of said particulate material than that of said second region.

6. The steam turbine blade of claim 5, wherein said non-metallic matrix material consists essentially of an elastomer.

7. The steam turbine blade of claim 6, wherein said particulate material consists essentially of metallic powder.

8. The steam turbine blade of claim 1, wherein said first region is a layer disposed proximate said closed bottom and said second region is a layer disposed adjacent said first region, wherein said filler material includes different first and second materials, wherein said filler material disposed in said first region consists essentially of said first material, and wherein said filler material disposed in said second region consists essentially of said second material.

9. The steam turbine blade of claim 8, wherein said second material consists essentially of an elastomer, and wherein said first material consists essentially of a non-metallic material other than an elastomer.

10. The steam turbine blade of claim 9, wherein said void volume also has a third region, wherein said third region is a layer disposed adjacent said second region and proximate said open top, wherein said filler material also includes a third material, wherein said material disposed in said third region consists essentially of said second and third materials, wherein said third material consists essentially of a screen material, and wherein said screen material has a higher average modulus of elasticity than that of said first material or said second material.

11. The steam turbine blade of claim 1, wherein said first region extends closer to said shank portion than said second region.

12. The steam turbine blade of claim 11, wherein said second region extends further from said shank portion than said first region.

13. The steam turbine blade of claim 12, wherein said first region includes a portion disposed proximate said open top and said second region also includes a portion disposed proximate said open top.

14. A steam turbine blade comprising:
   a) a steam-turbine-blade shank portion;
   b) a steam-turbine-blade metallic airfoil portion attached to said shank portion and having a pressure side and a suction side, wherein at least one of said pressure and suction sides includes at least one surface recess, wherein said at-least-one surface recess has a void volume, an open top, and a closed bottom, and wherein said void volume has adjacent first and second regions; and
   c) filler material disposed in and bonded to said at-least-one surface recess and generally completely filling said void volume, wherein said filler material as a whole has a lower average mass density than that of said metallic airfoil portion as a whole, and wherein said filler material in said first region has a higher average modulus of elasticity than that of said filler material in said second region and said filler material in said second region consists essentially of an elastomer.

* * * * *